No. 838,336. PATENTED DEC. 11, 1906.
H. JAPP.
AIR LOCK.
APPLICATION FILED APR. 20, 1906.

3 SHEETS—SHEET 1.

WITNESSES
Paul A. Blair
A. E. Powell

INVENTOR
Henry Japp
BY
Howson and Howson
ATTORNEYS

No. 838,336. PATENTED DEC. 11, 1906.
H. JAPP.
AIR LOCK.
APPLICATION FILED APR. 20, 1906.

3 SHEETS—SHEET 2.

WITNESSES
Paul A. Blair.
A. C. Powell

INVENTOR
Henry Japp
BY
Howson and Howson
ATTORNEYS

No. 838,336. PATENTED DEC. 11, 1906.
H. JAPP.
AIR LOCK.
APPLICATION FILED APR. 20, 1906.
3 SHEETS—SHEET 3.
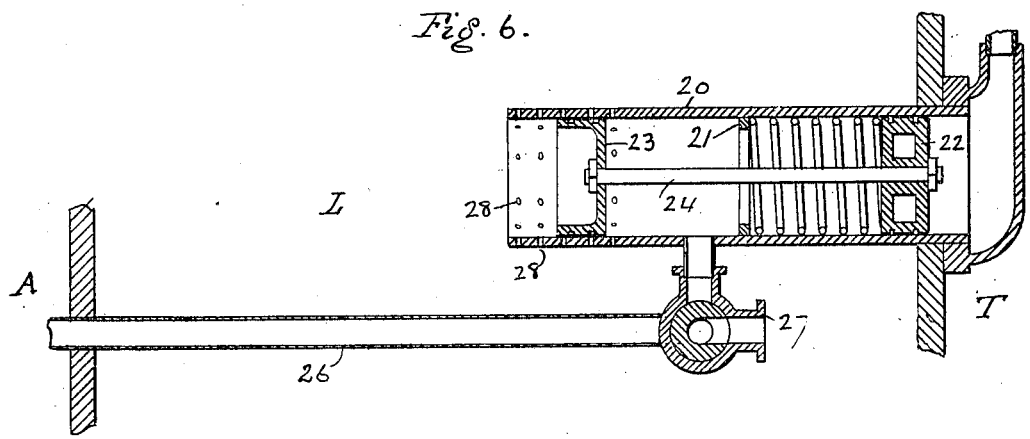
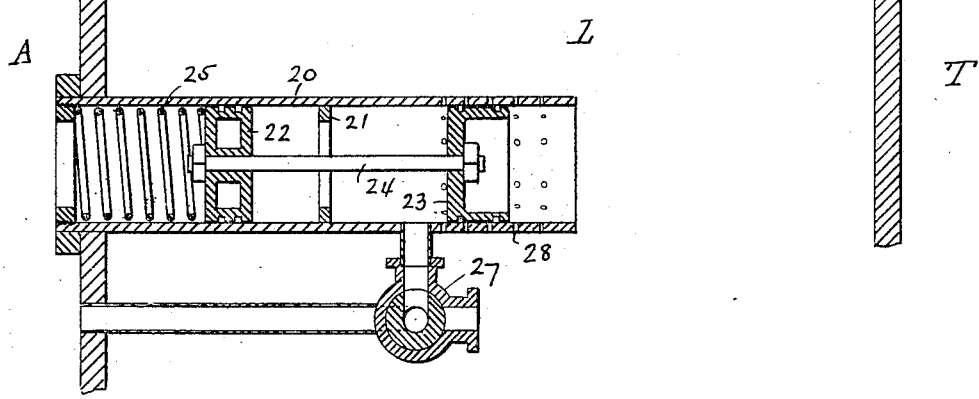
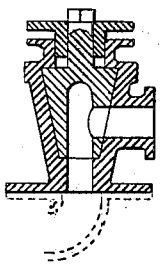
WITNESSES
Paul A. Blair.
A. C. Powell
INVENTOR
Henry Japp
BY
Howson and Howson
ATTORNEYS

UNITED STATES PATENT OFFICE.

HENRY JAPP, OF NEW YORK, N. Y., ASSIGNOR TO S. PEARSON & SON, INC., OF LONG ISLAND CITY, NEW YORK, A CORPORATION OF NEW YORK.

AIR-LOCK.

No. 838,336.

Specification of Letters Patent.

Patented Dec. 11, 1906.

Application filed April 20, 1906. Serial No. 312,936.

*To all whom it may concern:*

Be it known that I, HENRY JAPP, a subject of the King of Great Britain, residing in the borough of Manhattan, in the city, county, and State of New York, have invented Improvements in Air-Locks, of which the following is a specification.

It is commonly supposed that caisson disease, which attacks men working under compressed-air pressure in subaqueous tunnels or the like, is caused to some extent by a too rapid rate of decompression of the air as the men come out through the air-locks, and I have observed that although the men take a fair time to lock out they do so with the tap communicating with the atmosphere open to the same extent during the whole period of decompression, so that if it takes a total of eight minutes to "lock out" for a pressure of thirty-two pounds instead of the pressure being uniformly reduced at the rate of four pounds per minute the first sixteen pounds is reduced in about two minutes, the rate of decompression becoming gradually slower as the pressure inside the lock becomes more nearly equal to that of the atmosphere.

My invention consists in providing the air-lock with means to maintain a constant rate of decompression of the air in the air-lock.

My invention may be carried into effect by different mechanical devices.

Figure 1:
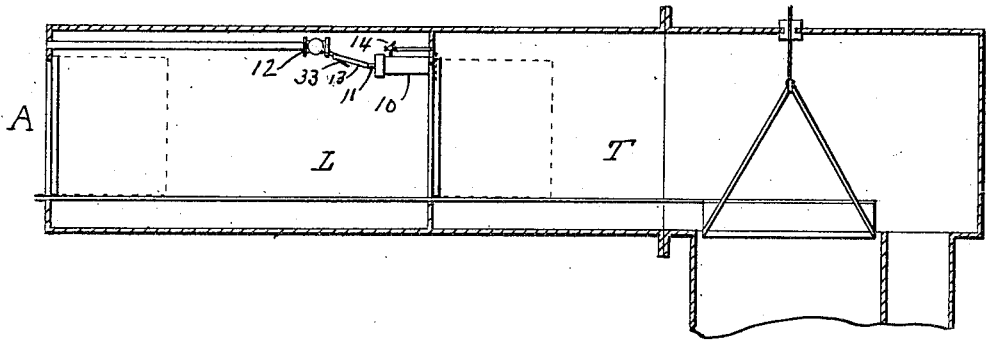
Figure 2:
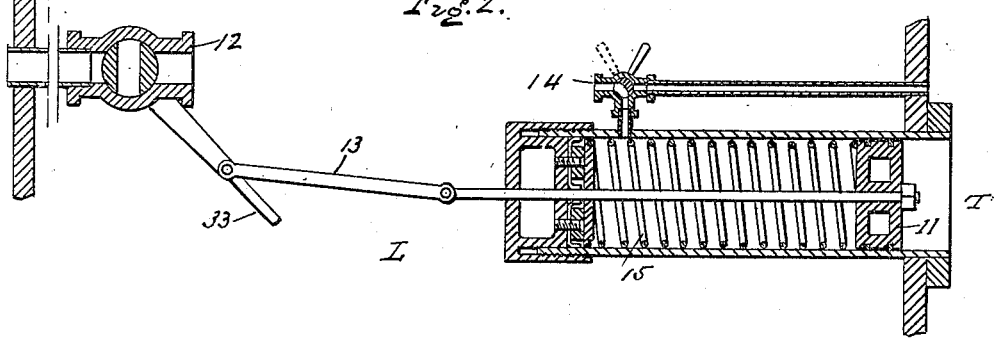
Figure 3:
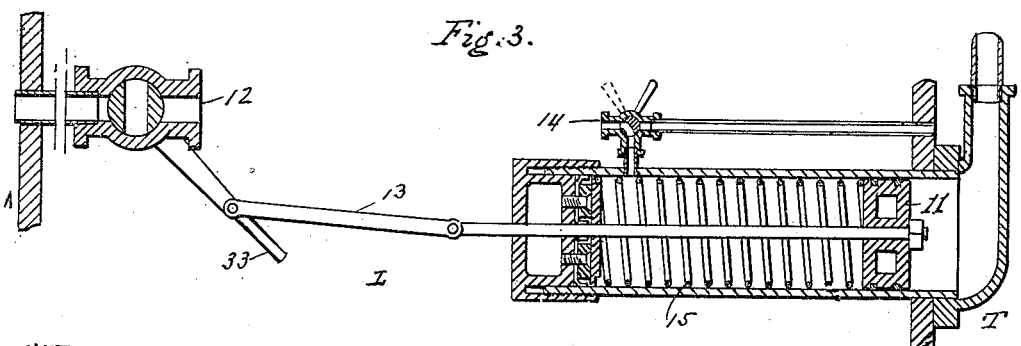
Figure 4:
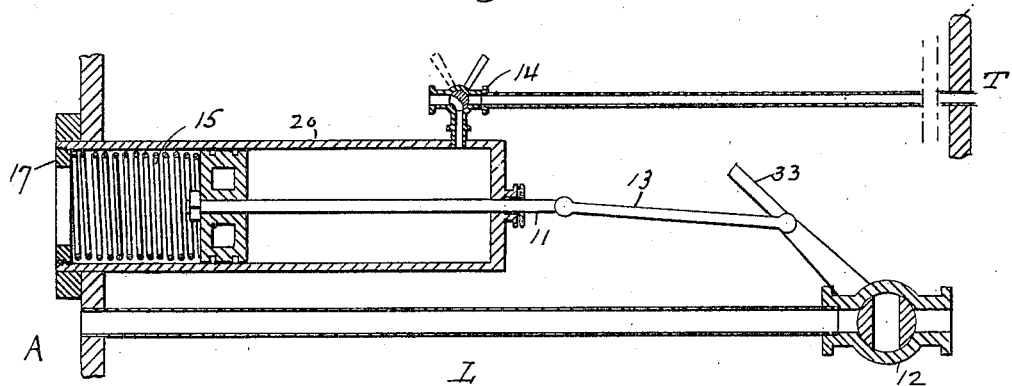
Figure 5:
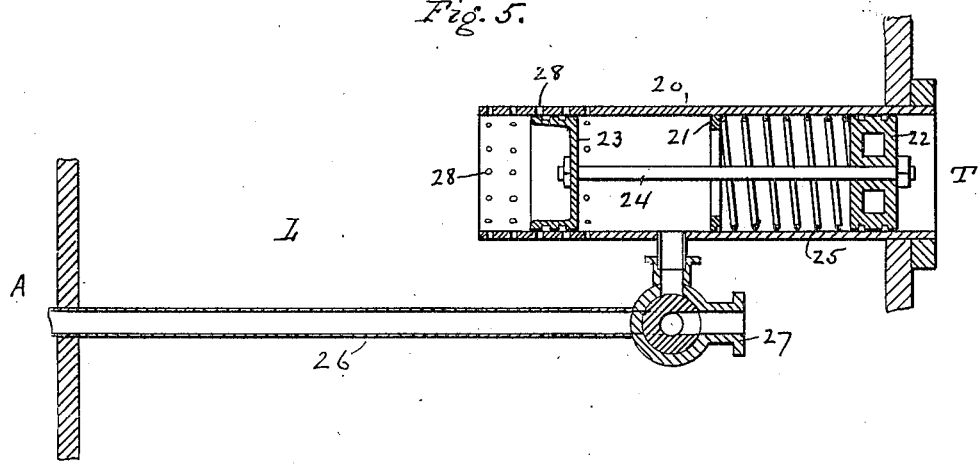

In the accompanying drawings, Figure 1 is a view of an air-lock. Figs. 2, 3, and 4 represent sections of different although similar constructions of my apparatus applied within an air-lock, showing diagrammatically the different ways in which the device may be connected with either the high pressure in the tunnel or the low atmospheric constant pressures. Figs. 5, 6, and 7 represent similar views of a modified form. Fig. 8 shows one of the cocks in detail.

Referring to the drawings, especially to Figs. 1 and 2, A indicates the entrance to the tunnel-shaft, which communicates with the atmosphere and may be considered to have a constant low pressure equal to the atmosphere. T indicates the tunnel or the source of constant high pressure, and L represents the air-lock the pressure of which at the beginning of the operation of locking out will equal the pressure in the tunnel. At any suitable point in the air-lock—as, for example, in the wall adjacent to the tunnel—is mounted a cylinder 10 and piston 11, one side of which is constantly exposed to the pressure of the air in the tunnel. On the opposite wall, communicating with the atmosphere, is a tap 12, adapted to be automatically opened and closed by movement of the piston 11 through suitable lever-and-link connections 33 and 13. A two-way cock 14, adapted to be manually operated, controls communication between the interior of the cylinder on the opposite side of the piston from the tunnel and either the pressure in the tunnel or that of the lock, as desired and for the purpose about to be explained. In locking out the men enter the lock from the tunnel, and the cock 14 being in either of its two positions the pressures on opposite sides of the piston will be equal. The passage between the tunnel and the lock is then closed, and a preliminary reduction of the pressure in the lock is then obtained by manually opening the tap 12 for a very short time. On this slight reduction of pressure in the lock the pressures on the opposite sides of the piston will differ, the cock 14 being then in the position shown by full lines—that is, the pressure from the tunnel being the greater the piston is forced in against the spring 15, and the tap 12 through the link 13 is thus gradually opened. As the difference in pressure becomes greater the spring is further compressed and the tap 12 opened wider until it reaches its open position and the pressure of the lock becomes equal to that of the atmosphere. When the "locking in" operation is begun, the tap 12 may be closed manually, or the cock 14 may be turned to the position shown in dotted lines, which will equalize the pressure on opposite sides of the piston. The spring 15 then expands, forces out the piston to its original position, and thereby closes the tap 12. To permit of manual operation of the tap 12, the connection of its lever 33 with the link 13 should be easily detachable.

Fig. 3 shows the same construction having the end of the piston 11 exposed to an independent source of high-pressure air instead of the tunnel pressure. This construction would of course have the same operation.

Fig. 4 shows substantially the same construction as before, except that in this case one side of the piston is exposed to a constant low pressure, and the spring 15, which is on that side of the piston and abuts against a suitable collar or lugs 17, is normally compressed under high pressure, such as that of the tunnel or the lock at first. On a preliminary opening of the tap 12 by hand, as in the constructions previously described, the spring 15, expanding, will move the piston to further open the tap 12 for the automatic decompression. The tap 12 may be closed by admitting air from the tunnel on turning the cock 14 into the position shown in dotted lines.

The modification shown in Figs. 5, 6, and 7 differs somewhat in construction, but the principle involved is substantially the same. Referring to Fig. 5, a cylinder 20 is divided near its center by a ring 21, on one side of which is a piston 22, exposed to the tunnel-pressure, and on the other side is a similar piston 23. These pistons are connected by a rod 24 and move together. A spring 25, having suitable adjusting means, acts on one of these pistons, preferably and as shown on 22. A pipe 26 communicates between the atmosphere A and the interior of the cylinder 20 through a cock 27. The cock 27 is provided with three ways to permit either a direct exhaust to the atmosphere or through the automatic reducer. On entering the lock from the tunnel pressure is supposedly equal on both pistons. The pressure is then slightly reduced by manually opening the cock 27 to the atmosphere, after which the operation is carried on automatically, for the cock 27 being turned so as to communicate with the cylinder the air commences to leak out from the lock through the holes 28 in the walls of the cylinder. As the pressure in the lock falls the piston, under the air-pressure of the tunnel, is moved farther to the left, uncovering more and more holes, which is equivalent to opening the cock 12 of Fig. 1 wider. The valve may remain in that position until the locking-in operation is commenced, during which it will gradually return to its normal position under action of the spring. In Fig. 6 the same construction is used as in Fig. 5; but, as in the modification shown in Fig. 3, an independent source of high-pressure air is used to act on one of the pistons. The operation is of course the same as for Fig. 5.

In Fig. 7 substantially the same construction is used as above, and under the conditions described with reference to Fig. 4—that is, in exposing one of the pistons, preferably 22, to a source of constant low pressure, such as the atmosphere, and applying the spring 25 to that side of the piston, so that it is the pressure excited by the compressed spring that operates the reducer, as in Fig. 4.

The modification shown in Figs. 5, 6, and 7 is my preferred form of construction. It will be noticed that the separate tap 12 of Fig. 1 and connecting-links are done away with, and in the place is substituted the cock 27, which permits either a rapid and direct exhaust from the lock to the atmosphere or through the reducer, as desired.

I claim as my invention—

1. An air-lock, provided with regulating means for maintaining a constant rate of change of air-pressure therein.

2. An air-lock provided with an automatic regulator for maintaining rate of decompression constant.

3. In combination with an air-lock, an automatic reducer, comprising a cylinder and a piston and means connected therewith for regulating the rate of decompression.

4. In combination with an air-lock, an automatic reducer, comprising a cylinder and a piston and means connected therewith and controlled by movement of the piston for regulating the rate of decompression.

5. In combination with an air-lock, an automatic reducer, comprising a cylinder and a piston and means connected therewith and controlled by movement of the piston for regulating the rate of decompression and means for restoring the piston to its normal position.

6. In combination with an air-lock, an automatic reducer, comprising a cylinder and a piston, a cock outside of the cylinder, and means whereby the rate of exhaust through said cock is controlled by movement of the piston.

7. In combination with an air-lock, an automatic reducer, comprising a cylinder and a piston having two connected heads, a number of holes on the side of the cylinder adapted to be uncovered by movement of one head, the other head being subjected to and moved by a constant pressure, and a pipe communicating with the atmosphere and the interior of the cylinder whereby the air exhausts through the cylinder and pipe.

8. In combination with an air-lock, an automatic regulator for maintaining rate of decompression constant and means whereby the decompression may take place direct or through the reducer.

In testimony whereof I have signed my name to this specification in the presence of two subscribing witnesses.

HENRY JAPP.

Witnesses:
GEO. MEYSSON,
LOUIS PH. GEYER.